July 17, 1934.   J. L. ADAMS, JR   1,966,534
INDUCTION HEATING AND WELDING APPARATUS
Filed July 30, 1930
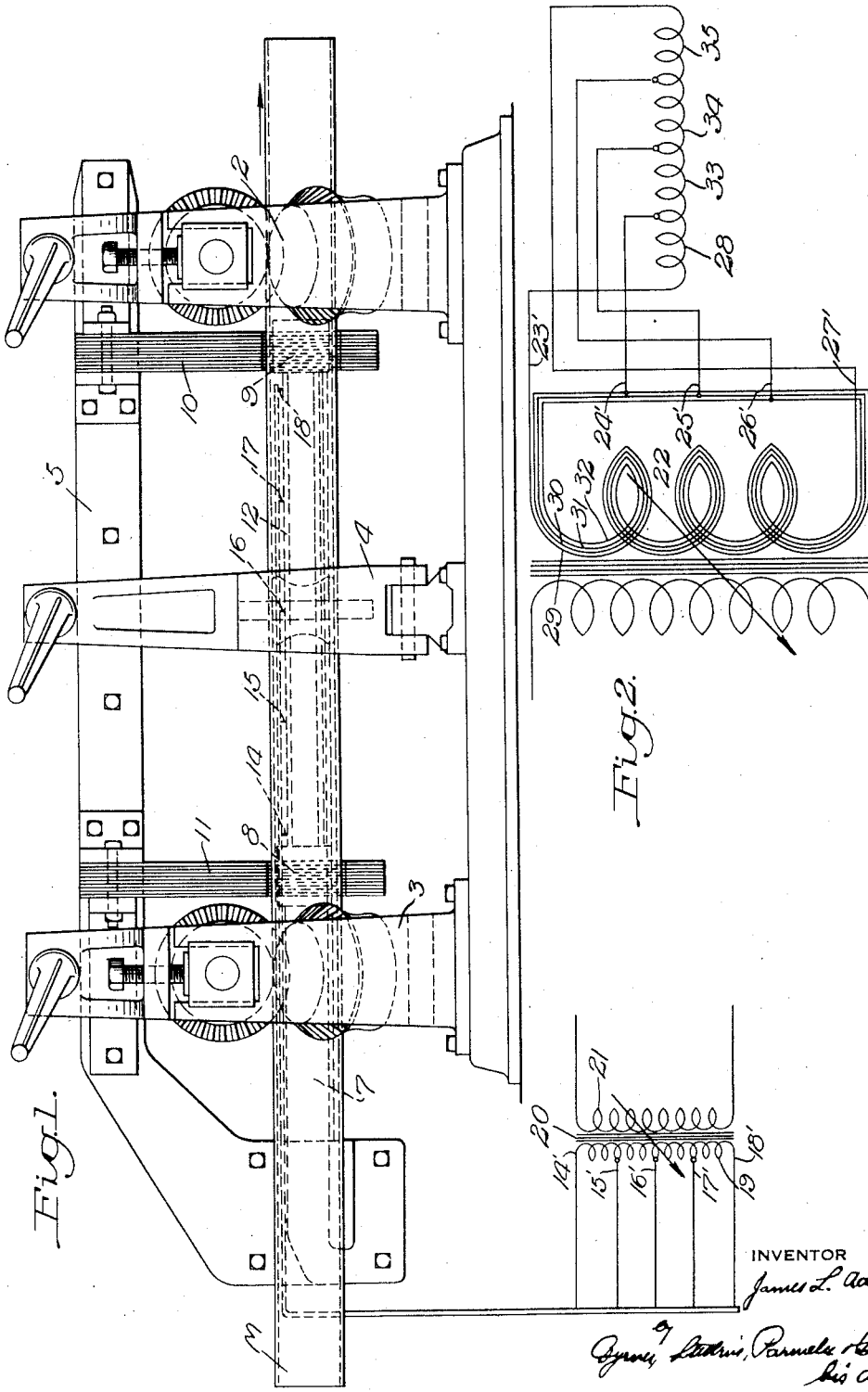
INVENTOR
James L. Adams Jr.

Patented July 17, 1934

1,966,534

UNITED STATES PATENT OFFICE 1,966,534

INDUCTION HEATING AND WELDING APPARATUS

James L. Adams, Jr., Youngstown, Ohio, assignor to The Youngstown Sheet & Tube Company, Youngstown, Ohio, a corporation of Ohio Application July 30, 1930, Serial No. 471,850

8 Claims. (Cl. 219—6)

The present invention relates broadly to the art of electrically heating metal articles by inducing a current flow therein, and more particularly to means comprising an improved coil and transformer construction obviating many of the difficulties heretofore encountered in the induction heating and welding of materials.

Developments more particularly in the art of electric heating as applicable to the problem of welding, for example, of substantially tubular material, have resulted in the construction of apparatus by means of which substantially tubular material may be heated and welded with extreme rapidity by a current flow induced in the material as a moving secondary. Such apparatus as has heretofore been developed, while effective for obtaining the results desired, has had certain disadvantages inherent therein. This has been particularly true of welding apparatus of the character utilized for the welding of substantially tubular material where characterized by the provision of a coil or coil structure entirely or partly within the tubular material. Such types of apparatus have required heating coil units of considerable length, with the coil units placed in such relationship to the material being welded as to obtain the maximum heating effect. This position of the coil is as close to the material being heated as possible, allowing for the practical conditions encountered. It has been necessary to utilize coils of considerable length in order to obtain sufficient capacity to heat the thicker gauges of material for which an operative commercial machine must be adaptable.

With a heating coil so located as to be effective within a body of substantially tubular heavy wall material, it has been found necessary to almost completely surround the coil with current carrying material which is actually carrying current before temperature conditions can be obtained in the edges of the material such as to result in the production of the desired welding heat in the seam. With any coil structure constituting a primary, where the material being heated constitutes a movable secondary, the coil operates effectively only when the current carrying portion of the material has advanced to such a point as to lie opposite the complete length of the coil. If a part of the length of the coil does not lie enclosed by the heavy secondary current flow, but is itself carrying the heavy primary current incident to generating the heavy induced current in those portions of the secondary which do lie so as to surround the primary, then the non-covered portions of the primary are free to set up tremendous air leakage fluxes around themselves, giving such exposed portions of the primary a very high reactance, which acts to cut down the current flowing through the whole primary, and hence cuts down the secondary current flow even in such of the tube as is properly enshrouding the primary. The more uncovered length of primary there is, the more the current is curtailed in the tube end which is still around the primary. Thus when using such apparatus for the heating of substantially tubular, but discontinuous lengths of material, the trailing and leading ends of the material, and more particularly the former, have heretofore only been partially heated, due to the fact that these portions of the material at times are effective for only partially cooperating with the full length of the coil or coils provided for inducing a current flow therein. This has necessitated scrapping of the extreme leading and trailing ends of the tubular material, the amount so scrapped constituting such a perceptible, even if minor, fraction of the total tonnage as to represent a serious factor in commercial production, particularly of larger sized tubes.

To overcome this wastage of material, it has heretofore been proposed to make several separate coils each of shorter over-all length than the complete length of the coil structure and each connected in parallel to the regulating, or supply transformer. This type of coil structure, while possessing the advantage that each of the coils comes up to effective operation as soon as the material being heated and its curent carrying seam is co-extensive with the length thereof, possesses the disadvantages that the several coil sections must each be wound with the full number of turns corresponding with the full voltage applied, and also insulated therefore, and that various coil sections must be insulated from each other, and many separate, insulated, heavy leads brought out from the welder. The insulation space requirement problems, particularly where applied to an inside coil structure, involve a number of manufacturing and operating difficulties due to the intense heat to which the coil assemblies are subjected, and the very limited space available here for heavy outgoing conductors.

The present invention has for one of its objects the provision of an improved coil structure and regulating transformer such that the desired heating of the material throughout the entire length thereof may be satisfactorily accomplished by a single coil of a minimum total number of turns of heavier material, while encountering fewer manufacturing and operating problems incident to prior structures, and utilizing a smaller total number of materially smaller outgoing leads for a given number of coil sections.

In the accompanying drawing I have shown, for purposes of illustration only, and more or less diagrammatically, certain preferred embodiments of the present invention. In the drawing:

Figure 1 is a side elevation of one form of apparatus constructed in accordance with the present invention; and Figure 2 is a diagrammatic view illustrating another embodiment of the invention.

The particular welding apparatus utilized in carrying out the present invention constitutes no essential part of the invention. It will be understood, therefore, that the parts of such apparatus which I have herein illustrated are included only for purposes of a general understanding of the invention.

Referring more particularly to Figure 1 of the drawing there is illustrated a welding apparatus of the induction type including a welding roll stand 2 and a crushing and sizing roll stand 3. It is not essential, however, that the stand 3 exert any actual crushing or sizing effect. In some instances, for example, the edges of the seam need not even be brought together while traversing this stand. These stands are preferably separated a substantial distance, thereby providing room therebetween for a flash regulating roll stand 4, all as well understood in the art.

Extending between the roll stands 2 and 3 is a yoke 5 of such construction that an extension thereon may carry a torpedo like structure 7 in position to permit the passage thereover of the substantially tubular material M to be heated and/or welded. The left hand portion of the torpedo structure is such as to receive and guide the tubular material, while the right hand portion constitutes an inner core terminating in pole pieces 8 and 9, cooperating with similar pole pieces 10 and 11 suitably secured to the yoke 5, and substantially encircling the work.

Intermediate the pole pieces 8 and 9 the core is provided with a continuous primary heating coil 12. By continuous primary heating coil I mean a coil extending continuously from end to end thereof as distinguished from a coil divided into a series of separately wound sections. At suitable points throughout its length, the continuous primary coil 12 is provided, in addition to its normal end terminals 14 and 18 with taps 15, 16 and 17. These taps, as illustrated in Figure 1, and which may be about one-half the capacity of the end terminals of the coil, are connected permanently to corresponding taps 15', 16' and 17' of a secondary coil 19, of a regulating or other current supply transformer, the end terminals 14 and 18 respectively being connected to the end terminals 14' and 18' of the transformer. While I have herein illustrated the respective taps as being secured to the coil 12 and to the transformer secondary 19 at substantially uniform intervals, the points at which the taps are taken off are subject to wide variation, it being possible to provide a considerable electrical length between certain taps, with a much less length between other of the taps. In particular, it may be desirable that the number of turns or windings between adjacent taps on the opposite ends of the heating coil and correspondingly at the opposite ends of the transformer secondary, be much smaller than the number of turns between the other taps. By such a construction it is possible to obtain more effective heating of the leading and trailing ends of the material for reasons which I have hereinbefore pointed out, since the full effectiveness of such portions is obtained when only a comparatively short length of the material is in the zone of the coil.

In like manner a comparatively small number of turns on the heating coil might be energized by a very moderately larger number of turns on the transformer secondary 19 or vice versa, depending upon the particular results desired.

The transformer secondary 19 is diagrammatically illustrated in cooperative relation to the transformer core 20 and the primary 21. With such a construction it may be assumed for example that a 2300 volt 60 cycle alternating current of from say 1000 to 2000 amperes is supplied to the primary coil 21. With proper transformer windings this will produce from 600 to 900 volts in the secondary with approximately from 3000 to 5000 amperes output. These figures are given as illustrative only and not in any sense for purposes of limiting the present invention.

With the construction just described, the full effectiveness of any portion of the continuous coil 12 between adjacent taps is obtained when such portion is enclosed within current carrying parts of the tubular material, regardless of the relationship between the material and the remaining portions of such coil.

I have found, however, that with such a construction when either end of a pipe is passing, for example, over the section of the coil 12 fed by the terminal 14 and the tap 15, there is in general a non-uniform magnetic condition induced in the regulating transformer due to the fact that all the different sections of its secondary coil lie in what may be considered as somewhat independent leakage magnetic fields. Thus, if one coil section happens to be heavily loaded, while the others are not, the primary current must rise throughout the entire primary coil length, most of which length will not have secondary current flow adjacent thereto. Hence, there will be nothing to prevent such unopposed portions of the primary from building up a fairly large leakage magnetic field around the unopposed sections. This will result in increase in primary reactance, and therefore a choking back of its current flow, tending to lower the secondary current in the one section that needs the full value thereof. This lowering is just what I do not want. In order to obviate the objections incident to such a construction I may, if desired, use a system of the character illustrated diagrammatically in Figure 2 wherein the transformer secondary 22 instead of comprising a single continuous coil with the coil sections succeeding one another in space axially of the transformer, comprises a plurality of windings so disposed that the coil sections between the terminals 23' and 27' and taps 24', 25' and 26' corresponding generally to the transformer taps before described, are effectively in similar space locations in a common magnetic field of the transformer. Such a result may be obtained by winding the coil in such manner that the various secondary sections are wound all together at one and the same time, using parallel lying turns side by side, one from each section but insulated from each other. This parallel turn, single unit welding will now extend throughout substantially the length of the magnetic field of the transformer. This complicates the transformer construction somewhat, but enables me to simplify the welder torpedo which is disposed in a location where space is much more at a premium. With such a construction, when the end of a body of tubular material passes over the section of the torpedo heating coil 28 for example, fed by the transformer terminals 23' and tap 24', the secondary coil section 29 of the transformer connected therewith will be in the same field as the secondary transformer coil sections 30, 31 and 32 feeding respectively the heating coil sections 33, 34 and 35, and thus the delivered voltage cannot drop materially lower on this one section than on the others, or vice versa, furthermore, since every respective turn of every secondary coil section is intimately close to the same respectively numbered turn of every remaining section, throughout its full length, an increased secondary current flow through any one secondary coil section will oppose in flow direction the full length of the primary coil, instead of just a short section thereof as before, so that now no excess magnetic leakage can occur around the primary turns which are away from close association with current carrying secondary copper, since no such isolated primary turns now exist. Thus, no excess magnetic leakages occur in this case; there is no undue increase in primary coil reactance, and hence no restriction upon full current flowing in any one section of the secondary whether the other sections are carrying current or not. For use in connection with this idea, however, the torpedo and regulating transformer coil sections should each have an approximately equal number of turns.

To those skilled in the art, it will be apparent that the construction proposed herein provides a plurality of equalizing taps and connections designated 15, 15', 16, 16', 17 and 17' in Figure 1 and 24', 25' and 26' in Figure 2. These connections or taps are designated equalizers or equalizing connections for the reason that they equalize or tend to equalize the current in the various sections of the coil. As before pointed out, various amounts of current may flow, simultaneously, in the different coil sections depending on whether they are enclosed by the pipe secondary or not. By way of example, we may take the top section of the secondary coil on the transformer, i. e., the section between terminal 14' and tap 15'. When the pipe starts to enclose the first section of the torpedo coil the connection 14' may be momentarily a positive connection, electrically speaking, and 15' may be a similar momentary negative connection, in which case the current flow in the corresponding taps will be in a predetermined direction. As the pipe proceeds over the next section of the torpedo coil it will pass over the section connected to the second coil of the secondary of the transformer, namely the one between taps 15' and 16'. Depending upon the conditions, it is possible that the connection 14' may be momentarily positive in character while 16' will be momentarily negative. This will determine the momentary current flow direction through 14, 14', 16', 16 and back to starting point 14. But what the direction of momentary current flow through 15 to 15' will now be, depends on whether the respective loadings taken by the two coil sections concerned have made 15 slightly positive momentarily to 15', or vice versa, irrespective of their relationship to the other terminal points mentioned. In other words, the flow at a given instant through 15—15' might be in either direction, depending on other factors, so that this flow is of the equalizing type, and always such as to tend to allow each section of the coil inside the pipe to load up independently of the loadings in the others. This same change of condition may exist through the balance of the inducing or torpedo coils, and this may cause variations or even reversals of current in the various equalizing or connecting taps between the secondary of the transformer and the various coil sections of the subdivided primary coil in the torpedo. It is to be especially noted that all this equalizing or compensating effect by the respective intermediate taps between coils of the transformer secondary and the sections of inducing primary within the tube being welded or heated, is accomplished without any switching in or out operations whatever, through permanently attached connections.

With a construction of the character described, it will be apparent that some of the disadvantages incident to the construction of a heating coil in a plurality of separate properly insulated sections are obviated, while maintaining the advantages of such a sectional coil construction. The present invention also obviates the disadvantages incident to the use of a single continuous coil fed from the transformerd secondary at the ends thereof only.

While I have herein illustrated and described certain preferred embodiments of the present invention, it will be understood that changes in the construction and operation of the various parts may be made without departing either from the spirit of the invention or the scope of my broader claims.

I claim:

1. In a progressive electric induction tube seam welding apparatus, a continuous primary heating coil having a plurality of taps leading therefrom, and a step-down power transformer including a secondary having a plurality of corresponding taps each electrically connected permanently to the respectively similar taps of said heating coil.

2. In a progressive electric induction tube seam welding apparatus, a continuous primary heating coil having a plurality of taps leading therefrom at different points throughout the length thereof, a step-down power transformer comprising a simultaneously wound multi-sectional secondary having taps leading therefrom at different points throughout the electrical length thereof, and permanent electrical connections between the secondary coil taps and corresponding heating coil taps.

3. In a progressive electric induction tube seam welding apparatus, a continuous primary heating coil having a plurality of taps leading therefrom, and a step-down power transformer including a secondary having a plurality of taps leading therefrom and permanently connected to the corresponding taps on the heating coil, said transformer taps dividing the transformer secondary into a plurality of coil sections all effective in a substantially common leakage magnetic field.

4. In a progressive electric induction tube seam heating apparatus, a continuous primary heating coil, a regulating step-down power transformer including a continuous secondary, and a plurality of permanently and separately interconnected taps on said heating coil and said transformer secondary.

5. In a progressive electric induction tube seam welding apparatus, a primary heating coil having an equalizer tap, a supply transformer secondary with a similar tap, a permanent equalizing connection between the two said taps, and permanent connections between the respective end terminals of said heating coil and transformer secondary.

6. In a progressive electric induction tube seam welding apparatus, a primary heating coil having a plurality of equalizer taps, a supply transformer secondary having similar taps, and a plurality of permanent equalizing connections between the respective heating coil and transformer secondary taps, in addition to the usual coil end connections between said heating coil and transformer secondary.

7. In an induction heating apparatus, an inducing coil wound continuously from one end to the other thereof, means for supporting said coil, means for causing relative movement of the material to be heated and the coil, in inductive relation, a source of current for said coil including a separate winding, and a plurality of connections from points spaced successively along said winding to points similarly spaced along said coil.

8. In an induction heating apparatus, a coil continously wound from end to end thereof for inducing heating current in material to be heated, means supporting the coil in position to permit relative movement between the coil and the material to be heated while maintaining a current inducing relation therebetween, means for effecting such relative movement while maintaining such relation, and a plurality of taps connected permanently to a current source and to a plurality of intermediate points of said coil, the construction and arrangement of the taps being such that the current flow through different taps to different portions of said coil automatically varies in accordance with the position of the material relative to said coil.

JAMES L. ADAMS, Jr.